Oct. 27, 1970  E. L. JUELG ETAL  3,536,886
RADIAL WELDING APPARATUS

Filed Dec. 14, 1966  3 Sheets-Sheet 1

INVENTORS
EDWARD L. JUELG
CHARLES K. SIGEL
BY
*ecdel & Gouda*
ATTORNEYS

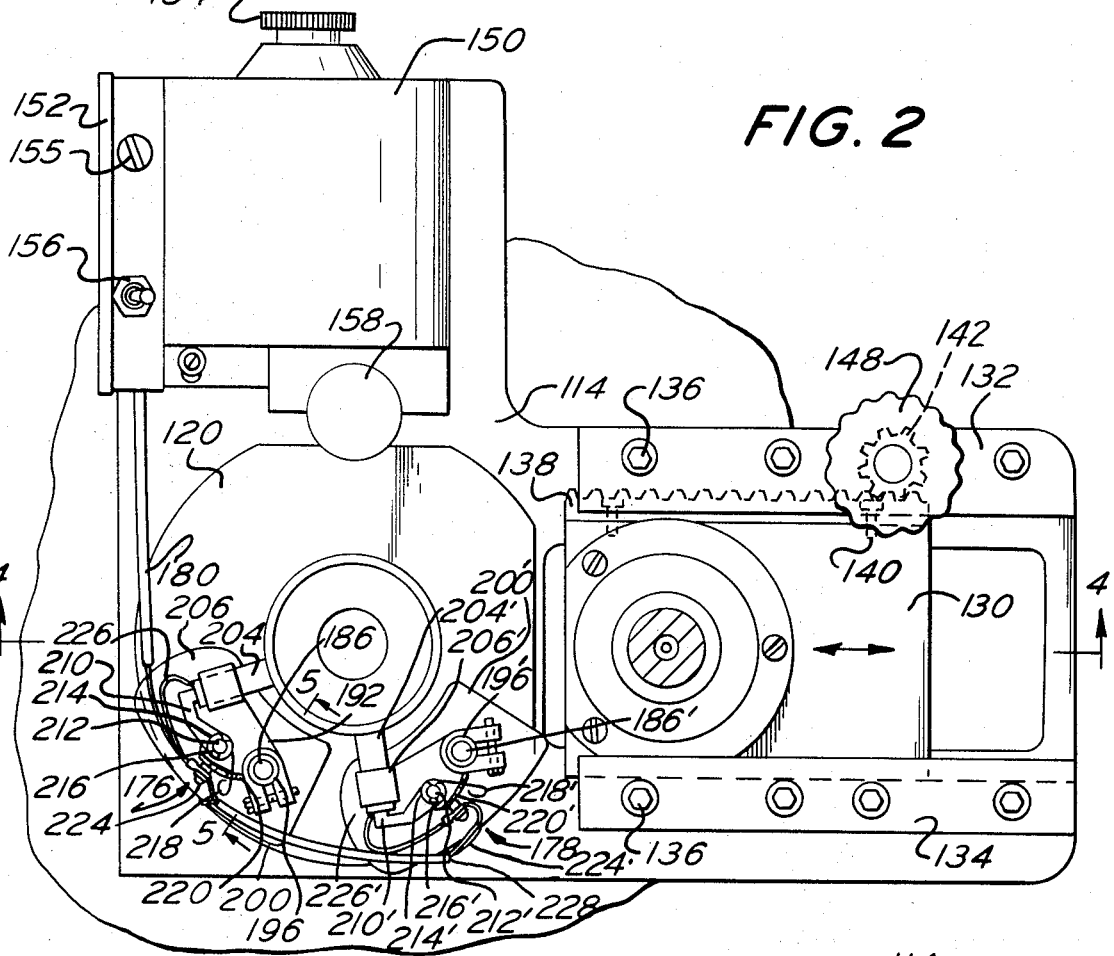
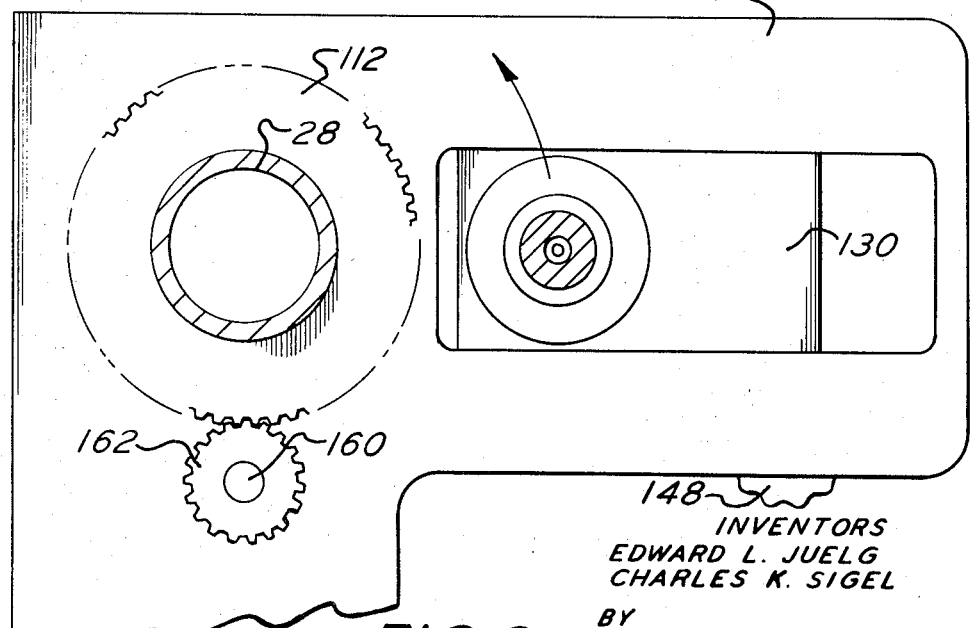

Oct. 27, 1970   E. L. JUELG ETAL   3,536,886
RADIAL WELDING APPARATUS
Filed Dec. 14, 1966   3 Sheets-Sheet 3
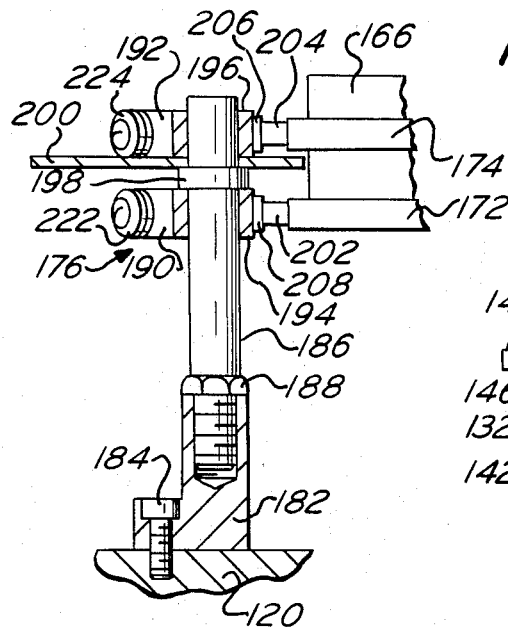
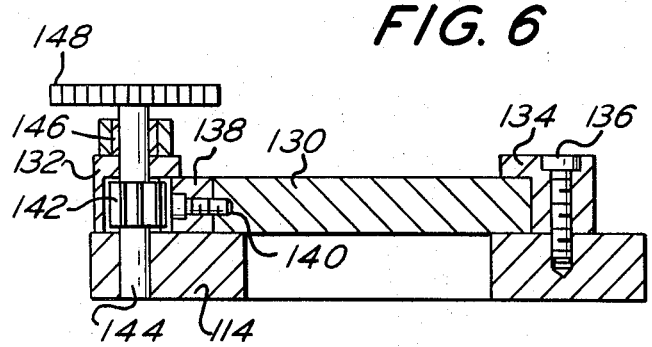
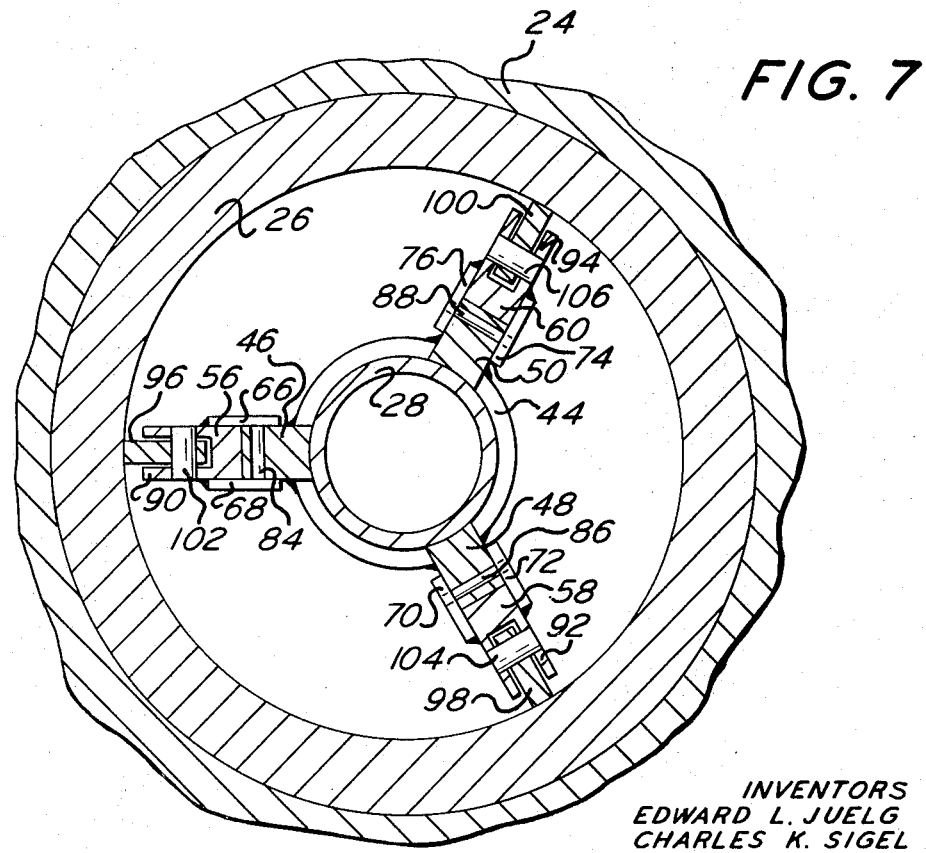
INVENTORS
EDWARD L. JUELG
CHARLES K. SIGEL
BY
ATTORNEYS United States Patent Office 3,536,886
Patented Oct. 27, 1970

1

3,536,886
RADIAL WELDING APPARATUS
Edward L. Juelg, Brookhaven, and Charles K. Sigel, Prospect Park, Pa., assignors to Baldwin-Lima-Hamilton Corporation, Philadelphia, Pa., a corporation of Delaware
Filed Dec. 14, 1966, Ser. No. 601,745
Int. Cl. B23k 9/12
U.S. Cl. 219—125      3 Claims

ABSTRACT OF THE DISCLOSURE

Disclosed herein is a radial welding apparatus. A support table to which is fixed a driven gear rotatably mounted on a central post. The table supports a drive motor and brush means for conducting current to the motor as well as a bearing for rotatably supporting the weld electrode. The table is driven about the post by the motor and a driven gear thereby causing the weld electrode to describe a circumferential arc. The planetary arrangement of the elements prevents the electrode wires and welding wire from becoming wound about the welding apparatus. Radial and vertical adjustment devices are provided for the electrode. A vertically adjustable clamping device is also provided for fixing the central weldment.

---

This invention relates to radial welding apparatus, and more particularly this invention relates to radial welding apparatus for making flat continuous radial welds of more than three hundred and sixty degrees without wrapping the electrical conductors about the apparatus.

Electrical welding apparatus necessarily requires heavy electrical cables for conducting current to the electrode and for conducting current to the motor apparatus for rotating the electrode or weldments. Power cables as well as control cables and the welding wire necessarily become wrapped around rotating welding apparatus as it is rotated. This means that sooner or later, the apparatus must be reversed and the cables unwrapped. Obviously, such cables present a hindrance to the operation of the apparatus as well as a safety hazard.

The present invention is concerned with providing a radial welding apparatus which avoids the foregoing difficulties. In particular, the present invention provides a planetary system for the electrode and apparatus for rotating the electrode whereby the cables conducting welding current to the electrode are not wrapped about the apparatus. In addition, the feed apparatus for the welding wire also does not become entangled with its electrical cables.

It is a general object of the present invention to provide new and unobvious radial welding apparatus.

It is another object of the present invention to provide radial welding apparatus with a planetary mounted electrode.

Yet another object of the present invention is to provide radial welding apparatus wherein the electrical cables for operating such apparatus will not become entangled with the apparatus.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a partial top plan view of the apparatus illustrated in FIG. 1 without the cover for the brushes taken along the line 2—2.

2

Figure 1:
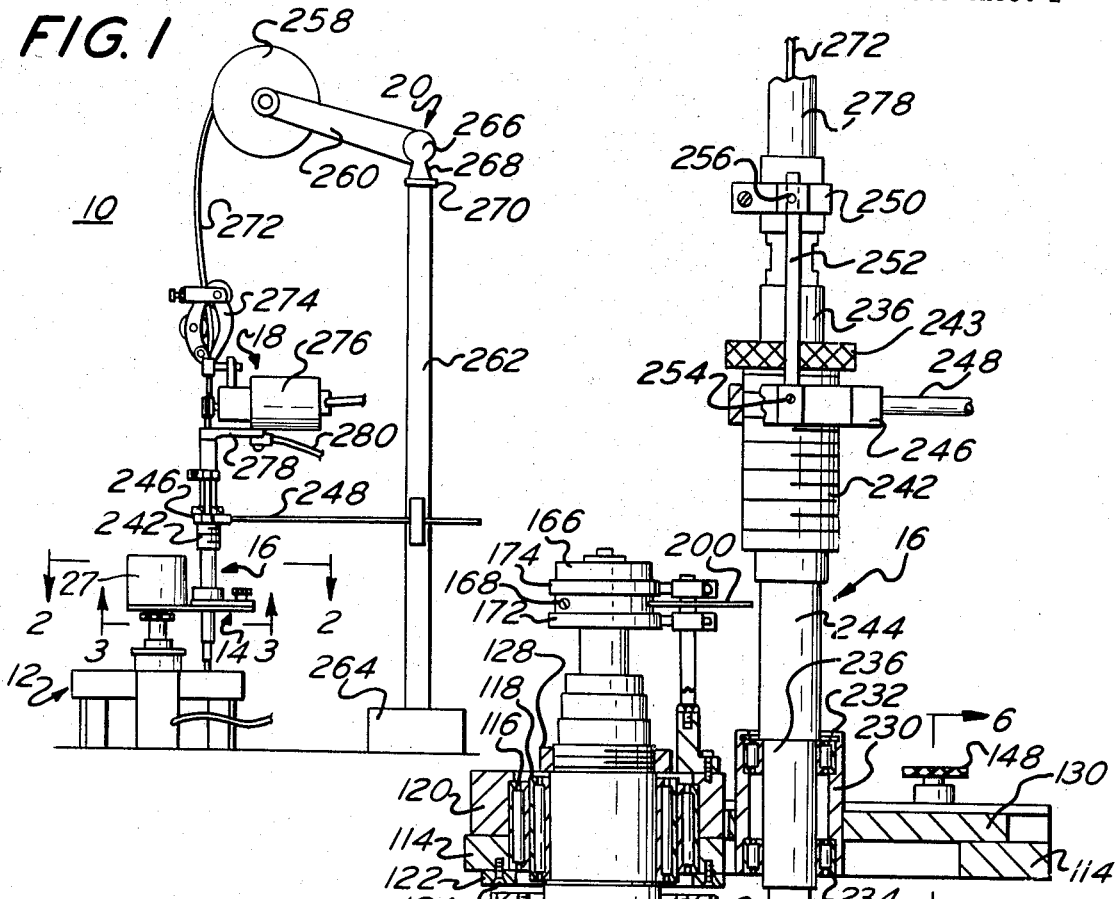
FIG. 1 is an elevational view of the welding apparatus.

FIG. 3 is a partial bottom plan view of the apparatus illustrated in FIG. 1 taken along the line 3—3.

Figure 4:
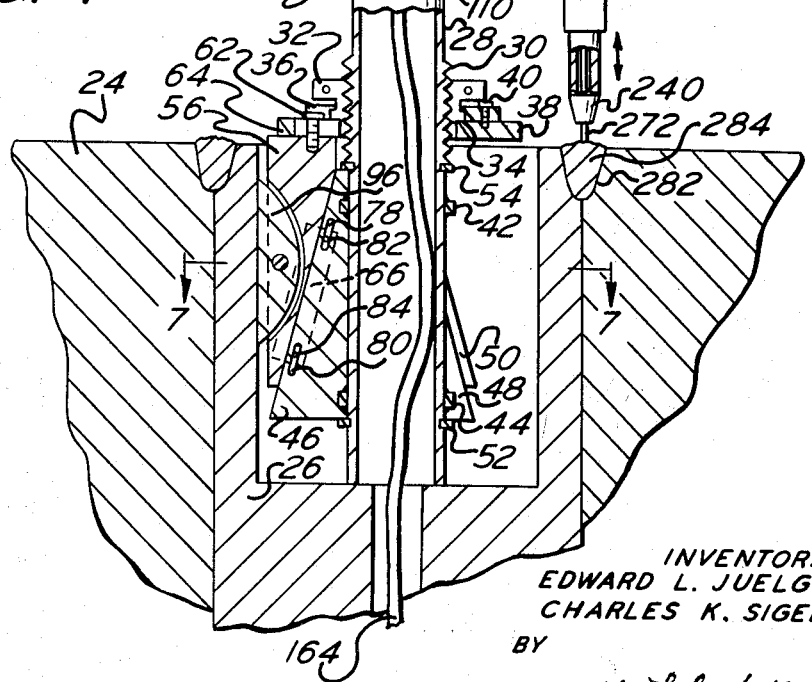

FIG. 4 is a sectional view of the apparatus illustrated in FIG. 2 taken along the line 4—4.

FIG. 5 is a sectional view of the apparatus illustrated in FIG. 2 taken along the line 5—5.

FIG. 6 is a sectional view of the apparatus illustrated in FIG. 4 taken along the line 6—6.

FIG. 7 is a sectional view of the apparatus illustrated in FIG. 4 taken along the line 7—7.

Referring now to the drawings in detail, wherein like numerals indicate like elements, there is shown in FIG. 1 an elevation view of the welding apparatus designated generally as 10.

Generally illustrated in FIG. 1 is a stand 12 for the metal piece to be welded, rotary support apparatus 14 for the adjustable electrode 16, welding wire feed mechanism 18, and a welding wire support stand 20. The foregoing basic elements cooperate during the welding operation to provide a radial weld in a metal piece or pieces. The disclosed welding process is of the submerged arc type but the apparatus has applicability to other devices having similar rotative functions. A detailed construction and operation of each of the foregoing elements is set forth below.

Referring now to FIG. 4, the welding apparatus 10 is shown in position for joining two concentric metal pieces 24 and 26 without the brush cover 27. Metal piece 24 rests upon the stand 12 but metal piece 26 may or may not rest upon the stand depending upon its length. In either instance, clamping means to be described below is provided for retaining piece 26 in position. A specific example of the type of welding operation for which the welding apparatus 10 can be used is the welding of a wicket gate stem pot into the discharge ring of a large turbine.

The welding apparatus 10 is primarily supported by a hollow upright post 28 which is set within a bore in the metal piece 26. The post 28 is partially threaded as shown at 30 and a nut 32 is in threaded engagement with the post. Integral with and depending from the nut 32 is a thrust ring 34 which is fixed in a recess between the retaining clamp 36 and the shoe retaining ring 38 which are held together by means of bolts 40. Stationary assembly rings 42 and 44 are welded to three stationary wedges 46, 48 and 50 equiangularly spaced about the post 28. Additional support for the wedges 46, 48 and 50 is provided by the retaining rings 52 and 54.

Sliding wedges 56, 58 and 60 are each mounted in co-operative relationship with one of the stationary wedges 46, 48 and 50. Each of the sliding wedges 56, 58 and 60 is supported on the shoe retaining ring 38 by bolts 62 which extend through slots 64 in the shoe retaining ring 38 and threadedly engage the wedges 56, 58 and 60. The slots 64 provide for lateral displacement of the sliding wedges 56, 58 and 60. The width of the head of bolt 62 is larger than the width of the slot 64 thereby retaining the wedges 56, 58 and 60 in position.

The wedges 56, 58 and 60 are guided in sliding engagement with the stationary wedges 46, 48 and 50 by means of a pair of guide bars welded or otherwise fixed to the sliding wedges 56, 58 and 60, and extending over the stationary wedges 46, 48 and 50. The pair of guide bars for each of the cooperating sliding and stationary wedges are designated 66–68, 70–72, and 74–76 respectively. Each of the stationary wedges 46, 48 and 50 is provided with a pair of slots which extend parallel to their outer edge. The slots for the wedge 46 are designated 78 and 80. Pins 82 and 84 are fixed to the guide bars 66 and 68 and extend through the slots 78 and 80. Similar pins such as 86 and 88 cooperate with slots in the stationary wedges 48 and 50. The pins retain the sliding wedges against the stationary wedges and limit the amount by which the sliding wedges can be moved.

Each of the sliding wedges is provided with semi-circular recesses 90, 92 and 94 within which are mounted the shoes 96, 98 and 100. Shoes 96, 98 and 100 are semi-circular with their planar edge being outwardly disposed to engage the object to be clamped. Each of the shoes 96, 98 and 100 is held within their respective recesses 90, 92 and 94 by the pins 102, 104 and 106. The shoes 96, 98 and 100 are free to rock on their supporting pins 102, 104 and 106 so that their planar clamping edge can fully abut the wall of the object to be clamped even if such wall is not parallel to the outermost edge of the sliding wedges.

The operation of the wedge type clamp should be obvious from the foregoing description of its parts. Raising or lowering of the nut 32 along the threads 30 causes the sliding wedges 56, 58 and 60 to be displaced inwardly or outwardly as well as vertically. Once the shoes 96, 98 and 100 engage the side walls of the object to be clamped, the nut 32 can be tightened down so as to provide sufficient clamping pressure to hold the clamped object 26 in position.

A gear mounting plate 108 is fixed as by welding to the upper portion of post 28. Bolts 110 fix the sun gear 112 to the plate 108 and hence to the post 28.

An electrode support table 114 is positioned immediately above sun gear 112 and supported upon the post 28 by means of a double cup bearing 116 and a cone bearing 118 within the bearing housing 120. Cup bearing 116 is retained within housing 120 by means of the bearing retaining ring 122 which is bolted or otherwise fastened to the electrode support table 114 as by the flat head screws 124. The entire bearing structure is maintained in position on post 28 by means of a lock nut 128. As thus mounted, the table 114 is free to rotate about the post 28.

Referring to FIG. 2, the electrode support table is shown to comprise a first leg for supporting the drive motor and a second leg for supporting the electrode. As best shown in FIGS. 2 and 6, the electrode 16 is supported on a slide block 130 which is positioned in grooves defined by the electrode support table 114 and a pair of slide block clamps 132 and 134 which are fixed to the electrode support table by means of the bolts 136. A rack 138 is fixed to a side edge of the slide block 130 by means of the bolts 140. A pinion gear 142 is positioned within the slide clamp 132 in meshing engagement with the rack 138 by means of the shaft 144 which in turn is supported for rotation within the bushing 146. A handle 148 is provided on the end of shaft 144 for rotating it and the pinion gear 142 to thereby displace the slide block 130 along the leg of electrode support table 114.

A motor 150 is mounted by any conventional means (not shown) on the motor support leg of electrode support table 114. A control box 152 is mounted on the side of motor 150 and includes therein conventional electrical means for varying the speed of the motor by adjusting the knob 154 and for reversing the direction of the motor by changing the position of the toggle switch 156. A fuse block 155 is provided on control box 152. The output of motor 150 is coupled through a gear box 158 to a vertical shaft 160 (FIG. 3) which extends below the table 114 and has fixed on the end thereof a pinion gear 162. The pinion gear 162 is in engagement with sun gear 112. As thus constructed, as the pinion gear rotates it drives itself about the circumference of the sun gear thereby causing the electrode support table 114 to rotate about post 28.

Electrical current is fed to the motor 150 by means of a cable 164 (FIG. 4) which extends through post 28 and is connected to the double ring collector 166 which is mounted on post 28 by means of a set screw 168. Rings 172 and 174 of collector 166 are insulated from each other and connected to two insulated conductors within the cable 164.

Two sets of double housing brushes 176 and 178 are mounted to the bearing housing 120. Appropriate electrical conductors 180 are connected to an outlet in box 152 of motor 150 for conducting current to and from the motor.

The double rotating brushes 176 and 178 are identical in structure. Accordingly, only double rotating brush 176 will be described in detail. Parts of double rotating brush 178 that are the same as parts of double rotating brush 176 are identified by primed numerals.

Referring to FIG. 5, the double rotating brush 176 is supported on bearing housing 120 by means of a bracket 182 which is fixed in position by the bolt 184. A brush support post 186 is threaded into bracket 182 and fixed in position by means of the lock nut 188. A lower brush support bracket 190 and an upper brush support bracket 192 which are identical in structure are clamped to the post 186 as shown. Insulating bushings 194 and 196 are provided between the clamps and the post. Moreover, the plates are appropriately separated by means of a bushing 198 on post 186 and the insulating plate 200.

Brushes 202 and 204 are made of a conducting material and are slidably supported within open-ended brush housings 206 and 208 as best illustrated in FIG. 2. The brushes 202 and 204 are biased against the collector rings 172 and 174 by means of bias arms such as bias arm 210 illustrated in FIG. 2. Bias arm 210 is rotatably mounted on a post 212 which extends upwardly from upper brush support bracket 192. Bias arm 210 is maintained on post 212 by means of washer 214 and cotter pin 216. Arm 210 is biased against brush 204 by means of a wire spring 218 which is connected to it and fixed in a notch in the spring bracket 220. Bracket 220 is integral with the upper brush support bracket 192. Similar biasing structure is provided for each of the brushes in the rotating brush sets 176 and 178.

Electrical connecting posts are provided on each of the spring brackets. As shown in FIG. 2, a conductor 226 is connected to the brush 204 at one end and to the post 224 at the other end. The connecting posts 224 and 224' are electrically connected by a conductor 228 and thus define a common terminal for one side of the electrical input to motor 150.

The lower brushes on each of the rotating brush sets are similarly connected to each other and to the second electric terminal of motor 150.

The function of the brushes should be obvious from the foregoing description. Thus, the brushes will make continuous contact with the collector rings 172 and 174 as the motor drives table 114 and hence the brushes about the post 28.

A bearing housing 230 is welded or otherwise fixed to the slide block 130. A pair of roller bearings 232 and 234 are mounted within the housing 230 to rotatably support the electrode 16. Bearings 232 and 234 are of the type that will permit the electrode to oscillate through a small arc of approximately 15° to 20°.

As best shown in FIG. 4, the electrode 16 comprises a hollow post 236 which is supported for rotation about its axis by the bearings 232 and 234. A connector 238 depends from post 236 and supports the tip 240. Vertical adjustment screw 242 having a knurled head 243 is fitted around post 236 and rests upon vertical adjustment spacer 244 which also surrounds post 236. A vertical adjustment nut 246 is in threaded engagement with vertical adjustment screw 242 and supported at the end of electrode support rod 248. Rod 248 is slidably fixed to support stand 20 by a suitable bracket so that the rod can move transversely of the support stand as the electrode 16 rotates about support shaft 28.

A clamp 250 is provided on post 236 for slidably receiving rod 252 which is fixed to vertical adjustment nut 246 by means of a roll pin 254. A similar roll pin 256 in clamp 250 permits the rod 252 to be fixed therein.

The vertical position of tip 240 can be adjusted by rotating vertical adjustment nut 246. Such adjustment displaces nut 246 upwardly or downwardly relative to screw 242. Such displacement is transferred through rod 252 to clamp 250 and hence to post 236 which slides within the bearing 232 and 234.

The stand 20 is provided for supporting a reel 258 of welding wire. The planetary rotation of the electrode 16 requires that the reel 258 be above the post 28. Accordingly, the reel 258 is rotatably mounted at the distal end of a bracket 260 which is adjustably connected to a post 262 fixed in base 264. For convenience in adjusting the position of reel 258, the bracket 260 connected to post 262 by a hinge 266 which in turn is provided with a stub shaft 268 fitted within a bearing 270. The hinge 266 permits the reel 258 to be raised or lowered in a vertical plane and the bearing 270 permits it to be positioned in a horizontal plane.

Welding wire 272 is taken off the reel 258 and fed through a conventional wire straightener and wire feed motor 276 mounted on a bracket 278 which is connected to the top of post 236. As shown the welding wire is fed downwardly through the hollow post 236 to a point where it protrudes from the tip 240. The bracket 278 also serves as an electrical connector for the heavy duty cables 280 conducting welding current to the electrode.

The foregoing described apparatus comprises a machine for the welding of flat radial type joints using the automatic submerged arc method for the deposition of filler metal. The submerged arc welding method need not be described in detail as it is conventional and well known in the art. Thus, the welding of metal pieces 24 and 26 at the joint 282 is accomplished by extending the weld wire 272 below a filler metal 284 and striking an arc between the wire 272 and the metal pieces 24, 26 which are conventionally connected to the welding power source.

The energization of motor 150 causes the table 114 to rotate about the post 28. Motor 150 is continuously energized because of the position of collector rings 172 and 174 and the two sets of double rotating brushes 176 and 178.

The electrode power cable 280 as well as the power cable for motor 276 and the welding wire do not wrap around the electrode 16 because it is rotatably mounted in bearings 232 and 234 which permits it to maintain a constant angular position relative to the stand 20 even though its angular position relative to post 28 on table 114 keeps changing.

The rack and pinion slide support for the electrode 16 provides a means for adjusting the horizontal distance between the electrode and post 28. In the preferred embodiment, the electrode can weld joints of from 10 to 20 inches in diameter. However, those skilled in the art will readily recognize that such distances can be adjusted by increasing or decreasing the size of the rack and pinion support. Similarly, the preferred embodiment permits the electrode tip to be raised and lowerd a distance of approximately three inches. This range also can be varied by providing a longer vertical adjustment screw.

The motor 150 for driving the electrode support table is preferably a 110 volt alternating current motor. In the preferred embodiment, the speed of the motor can be adjusted to cause the table to rotate at velocities from five to twenty inches per minute. The toggle switch 156 on control box 152 permits the direction of the motor to be reversed.

The welding apparatus 10 can be run continuously using the submerged arc welding method because the burned flux and slag can be removed while the welding is being done at another part of the weldment. If more than one pass is required to complete the weld, the new filler material and flux can be added after the burned flux and slag have been removed so the machine does not have to be shut down. Such continuous operation could not be accomplished if the machine had to be reversed to unwind the cables and control wires after each rotation of 360°. Thus, the machine can make continuous welds of more than 360°.

The present invention may be embodied in other specific forms without departing from the spirit or essential attributes thereof and, accordingly, reference should be made to the appended claims, rather than to the foregoing specification as indicating the scope of the invention.

I claim:

1. An electrical welding apparatus for making flat, curvilinear welds comprising a support having an outer surface and a longitudinal axis; first gear means disposed on said surface in coaxial relation to said support; table means having an aperture therein receiving said support, said table means being mounted for rotation about said support axis; second gear means rotatably mounted on said table means and having its axis spaced from said support axis and in driving engagement with said first gear means; means on said table for driving said second gear means about said first gear means so that said table means can rotate about said support axis; said table means having a second aperture with a second axis in spaced, substantially parallel relation to said support axis; electrode means rotatably mounted in said second aperture, said electrode means having an axis that is coaxial with said second axis; and means for constraining said electrode against rotation about its axis as said table means rotates about said first axis.

2. An electrical welding apparatus as defined in claim 1 wherein said electrode means comprises a first substantially cylindrical, hollow member rotatably supported by said table means; means for supporting electrode wires disposed within said first cylindrical hollow member and having a portion thereof extending beyond said cylindrical hollow member; means for supplying electrode wires to said cylindrical, hollow member, said supply means being in fixed spaced relation above said support; and radially extending means fixed to said cylindrical, hollow member and adapted to be constrained against rotational movement so that said cylindrical hollow member and said electrode wire remain in fixed angular relation to said radially extending means as said table rotates about said support.

3. An electrical welding apparatus as defined in claim 2 wherein said support is hollow and said means for driving said second gear means is an electric motor mounted on said table, said motor being connected to a power source by electrically conductive means in said support; first contact means mounted on said support and connected to said electrically conductive means and second contact means connected to said motor and movable therewith as said table means rotates about said support, said first and second contact means being in continuous engagement with each other as said table means rotates.

References Cited

UNITED STATES PATENTS

| 1,949,251 | 2/1934 | Gilbert | 219—125 |
| 2,938,106 | 5/1960 | Hawthorne | 219—125 |
| 3,035,157 | 5/1962 | Armstrong et al. | 219—125 |
| 3,159,734 | 12/1964 | Cooksey et al. | 219—125 |
| 3,215,812 | 11/1965 | Smith | 219—125 |
| 1,653,376 | 12/1927 | Skelly | 219—125 |
| 3,256,418 | 6/1966 | Bauer et al. | 219—125 |
| 3,345,494 | 10/1967 | Apblett et al. | 219—125 |

FOREIGN PATENTS

| 950,258 | 2/1964 | Great Britain. |

JOSEPH V. TRUHE, Primary Examiner

L. A. SCHUTZMAN, Assistant Examiner

U.S. Cl. X.R.

219—159